United States Patent [19]

Buys et al.

[11] Patent Number: 4,721,568
[45] Date of Patent: Jan. 26, 1988

[54] SEMIPERMEABLE COMPOSITE MEMBRANE

[76] Inventors: Henricus C. W. M. Buys, 146, Franciscushoff, Vianen; Aart J. Naaktgeboren, 109, Langewijk, Dedemsvaart; Aris van Elven, 35,Hittekamp, Leersum; Dirk A. Noordegraaf, 13, Loozermars, Gramsbergen, all of Netherlands

[21] Appl. No.: 771,015

[22] Filed: Aug. 30, 1985

[30] Foreign Application Priority Data

Aug. 30, 1984 [NL] Netherlands ............ 8402647

[51] Int. Cl.$^4$ ............................................. B01D 13/00
[52] U.S. Cl. ......................... 210/500.37; 210/500.41
[58] Field of Search ............. 210/490, 500.37, 500.38, 210/500.41, 506

[56] References Cited

U.S. PATENT DOCUMENTS

| 4,302,336 | 11/1981 | Kawaguchi et al. | 210/500.38 |
| 4,353,802 | 10/1982 | Hara et al. | 210/500.41 |
| 4,387,024 | 6/1983 | Kurihara et al. | 210/500.41 |
| 4,388,189 | 6/1983 | Kawaguchi et al. | 210/500.37 |

Primary Examiner—Ivars Cintins
Attorney, Agent, or Firm—A. Robert Theibault

[57] ABSTRACT

A semipermeable composite membrane on a microporous substrate, such as a polysulphone membrane having on its surface a semipermeable membrane being the reaction product of a polyamine, a water soluble polymer of formula 1

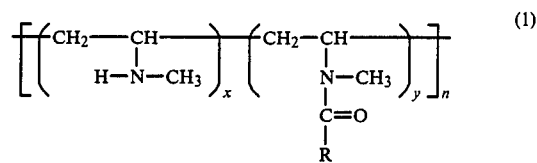

wherein R is hydrogen or an hydrocarbongroup, x is 0–99.9%, and y is 100-x mol. % and n indicates the molecular weight and of a crosslinking agent containing a polyfunctional group having reacted with the amino groups of the polyamine and of the polymer. In the formula 1 preferably R is an alkylgroup of 1–5 carbon atoms, particularly methyl, and n is equivalent to a mol. weight of more than 10.000. The water soluble polymer is advantageously a mixture of a polymer of formula 1 wherein x and y are both 50 mol. % and a polymer of formula 2,

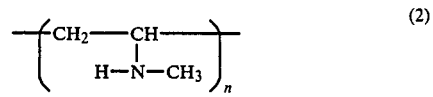

this last mentioned polymer being preferably obtained by hydrolysis of a compound of formula 1. The degree of hydrolysis is preferably 70 to 99.9%. The crosslinking agent is preferably a mixture of iso phtaloylchloride and trimesoylchloride; the polyamine is preferably an azolalkane compound having terminal amino groups with a straight chain comprising 8 to 24 carbon atoms, particularly 1.10-diamino-4.7-diazadecane; 1.14-diamino-4.8.11-triazatetradecane and 1.18-diamino-4.8.11.15-tetraazooctadecane. The flux of the membrane is at least 40 l/m$^2$.h and the salt retention at least 90%.

10 Claims, No Drawings

SEMIPERMEABLE COMPOSITE MEMBRANE

BACKGROUND OF THE INVENTION

The present invention relates to a semipermeable composite membrane on a microporous substrate having on its surface a semipermeable membrane comprising a crosslinked polymer comprising the reaction product of a mixture of (a) a water-soluble organic polymer with reactive amino group;
(b) a polyamine and
(c) a crosslinking agent containing a polyfunctional group being able to react with the reactive groups of the water-soluble organic polymer and also with the polyamine, this polyfunctional group having reacted with the amino groups of the organic polymer and with the polyamine.

Semipermeable composite membranes of the above-mentioned type, as known from German Offenlegungsschrift No. 2.950.623, have the advantage that the membrane is especially useful for the preparation of pure water from sea water and is eminently resistant to degradation in the presence of chlorine.

The good desalination is evident from the high salt retention of 99% which is obtained if a polyepihalohydrin or a polyethyleneimine is used as the soluble polymer.

This known membrane presents however, the disadvantage that the permeability of the membrane is relatively low as according to example XII of said German Offenlegungsschrift No. 2.950.623 at a retention of 99.6% a flux of 16 $l/m^2.h.$ is obtained.

Because of this low flux membranes of this type are therefore unsuitable in practice.

A similar membrane is known from German Offenlegungsschrift No. 3.013.171 in which use is made of polyalkyleneimines or polyalkyleneimine derivatives as the soluble polymer together with cyclic polyamines and crosslinking agents for the manufacture of the membrane thereby maintaining a ratio of polymer to polyamine of 1:0.05 to 1:1. This membrane does in fact give a high flux of 111 $l/m^2.h$ with a retention of 98.9%.

This known membrane has the disadvantage that a very strictly described combination of measures has to be met so that the manufacture of the membrane requires considerable expertise, as is evident from the comparison of Example 12 in German Offenlegungsschrift No. 2.950.623 with Example 18 in German Patent specification No. 3.013.171. In addition, the polyethyleneamine available commercially is a polymer with branched chains which does not favour constant polymer raw material quality.

Among the water soluble polymers being suitable for use in membranes of this type EP-A-0 031 730 mentions polymers of the formula $-CH_2-CH(NHR_{16})-$ wherein $R_{16}$ is an alkylgroup comprising 1 to 5 carbon atoms.

However, in order to obtain membranes having good properties an additional substance such as e.g. diethyl tartrate or glycol dichlorohydrine has to be added. Said additional compound does not react with the reactive amino groups of the polymer during the interfacial netting but only thereafter by increasing the temperature in order to bind the remaining reactive amino groups.

Apart from the addition of the additional substance and curing at two temperature levels, the polymer can practically not be obtained in a pure state as appears from the fact that this polymer is not used in the practical embodiments.

SUMMARY OF THE INVENTION

It is the main object of the invention to overcome these disadvantages and to provide a semipermeable composite membrane which offers the advantage of a constant quality with at least a flux of 40 $l/m^2.h$ minimum and a salt retention of at least 90%.

This object is achieved according to the invention in that the water-soluble polymer is a polymer of formula 1

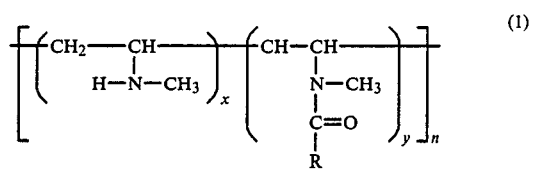

wherein R represents hydrogen or a hydrocarbon radical, x being comprised between 50 and 99.9 mol % and y being 100−x mol. % and n indicating the molecular weight.

Preferably R is an alkylgroup comprising 1 to 5 carbon atoms and n is equivalent to a molecular weight of higher than 10.000.

Using these water-soluble polymers composite semipermeable membranes are obtained which reproducibly show a good salt retention and in addition exhibit a very good flux without using any compound substantially differing from the polymer. Moreover, these membranes can be obtained with a constant composition. It should be noted that when the amount of N-vinyl N-acetamidogroups is too high the copolymer is less reactive in the reaction with the crosslinking agent, whilst in the absence of N-vinyl N-acetamido groups the membrane is less chlorine resistant.

The polymers according to the invention consist essentially of straight, unbranched chains and it has also been found that these composite membranes according to the invention, when used at elevated temperature, retain their retention of at least 90% as a result of their technical reversibility and later return to the original flux and retention at room temperature.

Appropriately the water-soluble polymer consist of a mixture of a polymer of formula 3 (this polymer is a polymer of formula 1 wherein x and y are both 50 mol.%).

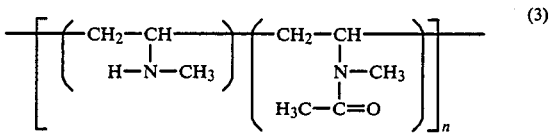

and a polymer of formula 2

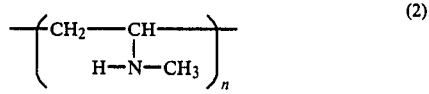

n indicating a molecular weight of more than 10.000.

Preferably the water-soluble polymer of formula 2, a poly-N-vinyl-N-methylamine, is obtained by hydrolysis of the copolymer according to formula 1, the degree of hydrolysis being 60 to 99.5, preferably 70 to 99.5%.

A degree of hydrolysis of 99% means that in a compound of formula 1, 99% of the hydrolysable N-acetamide group is hydrolysed, i.e. that 99% of the compound of formula 3 and 1% of the compound of formula 2 are present.

It is recommended to choose the concentration of the water-soluble polymer in an aqueous solution between 0.1 and 10% b.w. and preferably between 0.4 to 5% b.w. Said aqueous solution containing the polyamine for the formation of the semipermeable membrane after application to a porous substrate is covered with an organic solvent immiscible with water, with a crosslinking agent being capable of reacting with the reactive groups of the water-soluble organic polymer.

Examples of suitable polyamines are piperazines and, with particular advantage, substituted and unsubstituted azoalkane compounds containing terminal amino groups and having straight chains containing 8 to 24 carbon atoms, particularly 1.10-diamino-4.7-diazadecane ($N_4$); 1.14-diamino-4,8,11-triazatetradecane ($N_5$) and 1.18-diamino-4.8.11.15-tetraazooctadecane ($N_6$). The abbreviations $N_4$, $N_5$, $N_6$ are later on used for indicating these compounds.

Especially with these compounds particularly good membranes for desalination with a high salt retention are obtained.

Suitable crosslinking agents which can be used for the formation of the composite membrane according to the invention are isophthaloyl dichloride (IPC), trimesoyl chloride (TMC), toluene diisocyanate, m-benzenedisulphonylchloride and in particular diphenyletherdisulphonyl chloride (BFE).

Good results are obtained with crosslinking agents in the form of 1.5-naphthyldisulphonyl chloride (ND) and thiadiazole polyacid derivatives, particularly thiadiazoledicarbonyl halides, preferably 1.2.5-thiadiazole-3.5-dicarbonyl chloride, designated later in the description as TDZ.

Particularly good results are obtained by using the combination IPC/TMC and the polyamines $N_4$, $N_5$ and $N_6$.

The microporous substrate used in a semipermeable composite membrane according to the invention consists advantageously a polysulphone membrane.

To obtain a semipermeable composite membrane according to the invention it is advantageous to start from the tubular polysulphone membranes commercially available which are immersed after rinsing with double-distilled water in the wet state in an aqueous solution of the water-soluble polymer and a polyamine. After immersion the polysulphone membranes saturated with the aqueous solution are immersed for a short time in a organic solution containing the crosslinking agent. The tubular polysulphone membrane is then kept in an environment allowing evaporation of organic solvent and water.

The invention will now be illustrated by means of some examples. The starting products for these experiments were commercially available polysulphone membranes coated in a non woven tube of 14.4 mm diameter having a clean water flux of 80-150 $l/m^2.h$ at 100 kPa and a retention of 82% by using a 1% solution of a polyethylene glycol solution having a molecular weight of 40.000.

These tubular polysulphone membranes were thoroughly rinsed with double-distilled water and then immersed in the wet state in an aqueous solution of the water-soluble polymer and the polyamine for 15 minutes.

The tubular polysulphone membranes were then removed vertically from the water phase and held for 1 minute in the vertical position, the outer side of the polysulphone membrane was dabbed with filter paper, thereafter the membrane was immersed for 1 minute in an organic solution containing the crosslinking agent. The assembly was then exposed to the air for 5 minutes and thereafter kept at 90° C. for 15 minutes in circulating hot air.

After cooling, the composite membranes as obtained were tested with a 0.5% b.w. of sodium chloride solution at a pressure of 4.000 kPa at 25° C. and with a longitudinal flow rate of this aqueous sodium chloride solution of 2.30-2.50 m/sec.

DESCRIPTION OF THE PREFERRED EMBODIMENTS

EXAMPLE I

The starting material was an aqueous solution containing 1.0% b.w. of piperazine and 0.5% b.w. of a copolymer having formula 1 (R being methyl) with a molecular weight of 68,900, the copolymer as used containing 20 mol.% of N-vinyl-N-methylacetamide.

On the other hand the organic solution consisted of a solution of 1.8% b.w. of TDZ and 0.2% b.w. of TMC in n-hexane.

The composite membranes obtained by means of these solutions gave the following results:

| Flux in $l/m^2 \cdot h$ | Retention in % |
|---|---|
| 168.0 | 90.2 |
| 173.0 | 90.2 |
| 184.0 | 89.2 |

EXAMPLE II

Example I was repeated some months later and a flux was found of 184.0 $l/m^2.h$ and a salt retention of 89.0% or respectively 168.0 $l/m^2.h$ with 90.0% as the salt retention.

EXAMPLE III

Examples I and II are repeated by adding a polyamine 1.0% b.w. of 1.10 diamino-4.7 diazadecane ($N_4$) instead of piperazine to the 0.5% b.w. copolymer solution. The composite membranes had a flux of 49-53 $l/m^2.h$ and a salt retention of 96.0±2.0%.

EXAMPLE IV

Composite membranes were obtained by using a solution of 0.5% b.w. of a mixture of polymers obtained by hydrolysis of a polymer having formula 1, wherein R is methyl (molecular weight 167,500 and degree of hydrolysis 93%) and 1.0% b.w. of 1.18diamino-4.8.11.15-tetraazooctadecane ($N_6$) in water and 1.8% b.w. of IPC and 0.2% b.w. of TMC in n-hexane.

The composite membranes obtained gave after 3 h. flux of 49-53 $l/m^2.h$ and a salt retention of 98.8-99.3%. Experiments repeated some months later under the same conditions gave the same results.

EXAMPLE V

In this example the starting product was a flat polysulphone membrane.

The flat membrane was thoroughly rinsed with double-distilled water and then immersed in the set state in an aqueous solution as used in Example I.

The flat membrane was then removed from the water phase, held for 1 minute in the vertical position and then the outside of the polysulphone membrane was dabbed off with filter paper and immersed for at least 1 minute in the crosslinking agent used in Example I.

At 25° C. an average flux was found of 90.5 l/m².h and a retention of 99.0%.

EXAMPLE VI

Composite membranes were obtained by using an aqueous solution of 1.0% b.w. of 1.14-diamino-4.8.11-trizotetradecane ($N_5$), 0.5% b.w. of the polymer according to formula 1, R being $CH_3$ (molecular weight Mv 167.500 and degree of hydrolysis 92%), 1.8% b.w. of isophthaloyl chloride and 0.2% of trimesoylchloride in n-hexane.

The membranes presented after 3 h. a flux of 38–43 l/m²h. and a salt retention of 97.1–98.6%.

EXAMPLE VII

The influence of the degree of hydrolysis upon the flux and salt retention is examined by using an aqueous solution of 0.5% b.w. of 1.10-diamino-4.7 diazadecane ($N_4$) and 0.5% b.w. of a polymer.

Then n-hexane solution contained 1.8% b.w. of isophtaloylchlorid and 0.2% b.w. of trimesoylchloride.

The flux and salt retention determined after three hours were as follows:

| Polymer | | flux in l/m² · h | | Retention | |
| Mol. weight | Degree of hydrolysis | G | S | G | S |
| --- | --- | --- | --- | --- | --- |
| 96.800 | 27% | 85 | 8 | 96,64 | 0,6 |
| 96.800 | 47% | 100 | 14 | 96,83 | 0,9 |
| 68.900 | 53% | 120 | 6 | 97,48 | 0,2 |
| 68.900 | 60% | 82 | 11 | 97,61 | 0,9 |
| 167.500 | 92% | 78 | 2 | 99,17 | 0,2 |
| 217.000 | 98% | 70 | 14 | 98,93 | 0,2 |

G = average of 4 experimental data
S = standard deviation

EXAMPLE VIII

Composite membranes were prepared starting from an aqueous solution of 0.5% b.w. of the polymer of formula 1 (R=$CH_3$) (mol. weight 170.000; degree of hydrolysis 99.0%) and 0.5% b.w. of 1.10-diamino-4.7-diazadecane ($N_4$); the organic phase contained (n-hexane) contained 1.8% b.w. of iso phthaloylchloride and 0.2% b.w. of trimesoylchloride (TMC).

The test solution was a 0.3% b.w. $Na_2SO_4$ solution. At 27° C. and a pressure of 40 bar the flux was 55 l/m².h (average of four experimental data; standard deviation 5) and the retention was 99.3% (average of four experimental data; standard deviation 0) after three hours.

The flux was 205 l/m².h (average of four experimental data; standard deviation 24) and the retention 99.3% (average of four experimental data; standard deviation 0) at a temperature of 70° C. and a pressure of 70 bar after three hours.

What is claimed is:

1. A semipermeable composite membrane having a flux of at least 40 l/m².h and a salt retention of more than 89%, said composite membrane comprising a microporous substrate having on its surface a semipermeable membrane comprising a crosslinked polymer which comprises the reaction product of a mixture of
   (a) a water-soluble organic polymer with reactive amino groups;
   (b) a polyamine and
   (c) a crosslinking agent containing a polyfunctional group reacted with the amino groups of the organic polymer and with the polyamine, wherein the water-soluble polymer is a polymer of formula 1

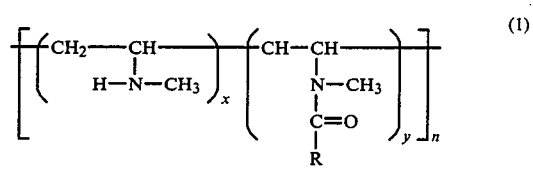

wherein R represents hydrogen or a $C_1$–$C_5$ alkyl group, x has a value of between 50 and 99.9 mol.% and y is 100−x mol.% and n is an integer such that the molecular weight of the polymer is more than 10,000.

2. A semipermeable membrane according to claim 1 wherein x is at least 60 mol.%.

3. A semipermeable membrane according to claim 1, wherein the water-soluble polymer consists of a mixture of a polymer according to formula 1, wherein x and y are both 50 mol.% and R is methyl, and a polymer of formula 2,

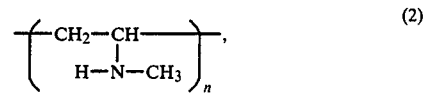

the polymer of formula 2 being obtained by hydrolysis of the polymer according to formula 1 wherein R is methyl, the degree of hydrolysis being 60 to 99.5% and wherein said hydrolysis replaces the group

by H.

4. A semipermeable membrane according to claim 3 wherein the degree of hydrolysis ranges from 70 to 99.5%.

5. A semipermeable membrane according to claim 1, wherein the polyamine is selected from the group consisting of piperazine compounds and azoalkane compounds having terminal amino groups with a straight chain comprising 8 to 24 carbon atoms.

6. Semipermeable membrane according to claim 1, wherein the crosslinking agent is selected from the group consisting of isophthaloylchloride, trimesoylchloride, a thiadiazole compound having two reactive groups, a thiadiazole polyacid derivative, and a diphenylether disulphonyl halide.

7. A semipermeable membrane according to claim 1, wherein the microporous substrate is a polysulphone membrane.

8. A semipermeable membrane as claimed in claim 1 wherein the polyamine is selected from the group consisting of 1.10 diamino-4.7-diazadecane, 1.14-diamino-4.8.11-triazatetradecane, and 1.18-diamino-4.8.11.15-tetraazooctadecane.

9. A semipermeable membrane as claimed in claim 1 wherein the crosslinking agent is a mixture of isophthaloylchloride and trimesoyl chloride.

10. A semipermeable membrane according to claim 1 wherein R is methyl.

* * * * *